J. H. BRAND.
SHIFTING MECHANISM FOR GEARING, &c.
APPLICATION FILED OCT. 30, 1917.
1,257,309.
Patented Feb. 26, 1918.
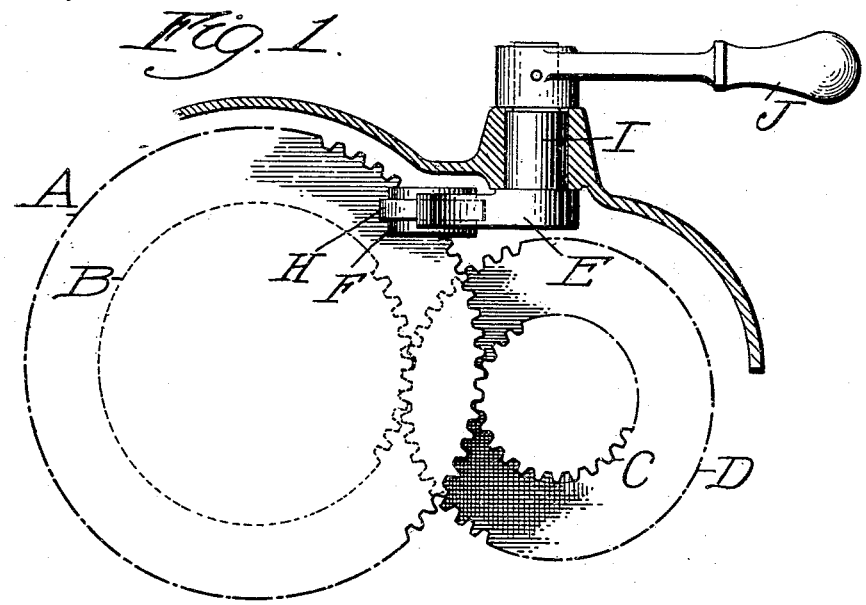
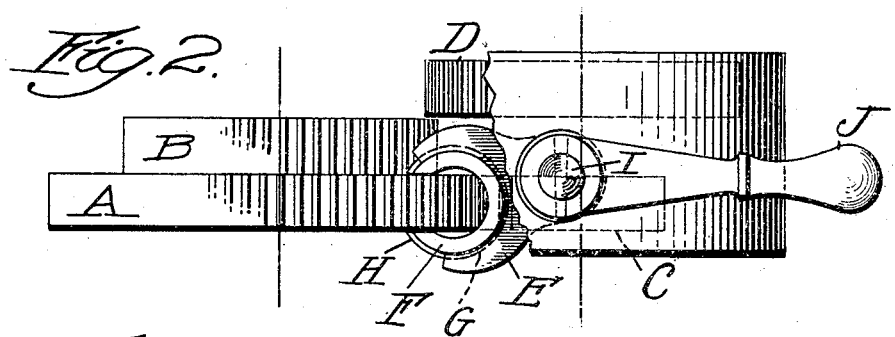
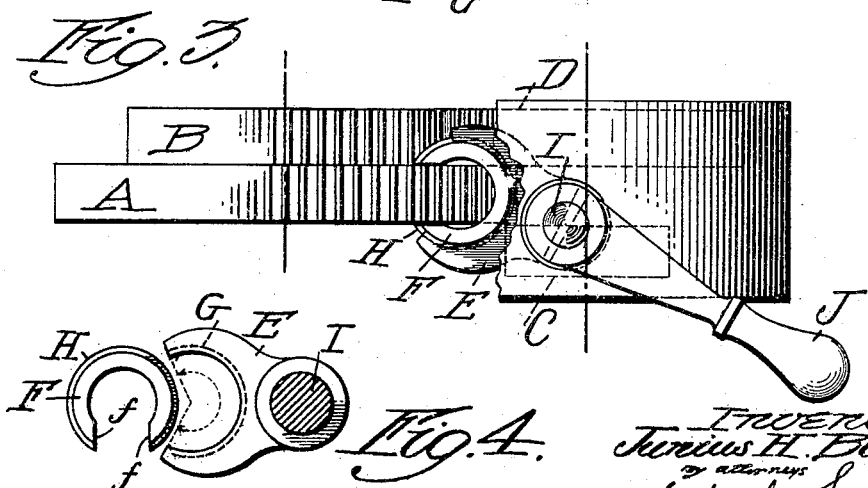

UNITED STATES PATENT OFFICE.

JUNIUS H. BRAND, OF NASHUA, NEW HAMPSHIRE, ASSIGNOR TO FLATHER & COMPANY, (INC.), A CORPORATION OF NEW HAMPSHIRE.

SHIFTING MECHANISM FOR GEARING, &c.

1,257,309.   Specification of Letters Patent.   Patented Feb. 26, 1918.

Application filed October 30, 1917. Serial No. 199,290.

*To all whom it may concern:*

Be it known that I, JUNIUS H. BRAND, a citizen of the United States, residing at Nashua, in the county of Hillsboro and State of New Hampshire, have invented a new and useful Shifting Mechanism for Gearing, &c., of which the following is a specification.

The object of this invention is to provide a new and improved shifting mechanism for gearing and similar rotating parts which shall be easy and simple to manufacture and efficient in operation.

The problem often arises in machine designing of shifting a rotating member such as a gear or a plurality of gears to occupy different axial positions. This shifting is usually accomplished by a yoke engaging a hub on the gear. This construction is expensive and often cannot be adapted to particular locations.

The specific object of my invention is to provide a simple and cheap mechanism for accomplishing this purpose. To this end the same consists of a pivoted shifting lever having a partial circular open mouthed end and a slotted circular engaging piece fitted therein and engaging the member to be shifted. The engaging piece is preferably provided with a rib to engage a groove in the open mouthed end of the shifting lever. The ends of the yoke forming the partial circular opened mouth end of the shifting lever are preferably arranged to subtend more than half of the circle so that when the engaging piece is fitted in said mouth and turned to position it will be locked in place therein. The shifting lever is engaged with the gear or member to be shifted and accurately holds the same in the desired position. When the lever is turned to shift the gear from one position to another, the engaging piece will turn in the yoke of the lever so that its engaging faces will always accurately fit on the sides of the gear.

The device may be applied to many locations such as the change gearing used in engine lathes, in automobiles and in many other locations. It is shown herein as adapted to the back gearing of a geared engine lathe.

Referring to the drawing in detail,

Figure 1 represents a partial end elevation of my improved shifting device;

Fig. 2 is a plan thereof showing the shifting gear in one position;

Fig. 3 is a similar view showing the shifting gear in the other position, and

Fig. 4 is a detail view of the shifting lever and engaging piece separate.

Referring to the drawing and in detail, A—B designates, a two-step double gear which is to be shifted axially to one or the other of two different positions. C and D designate two gears for coöperation with the double gear A—B. The gear A of the double gear is made of the proper diameter to mesh with the small gear C and the gear B is made of a smaller diameter to mesh with the gear D, which is larger than the gear C. When the parts are in the position shown in Fig. 2, the gear A will mesh with the gear C and the gear B will not engage the gear D. When the double gear A—B is shifted to the position shown in Fig. 3, the gear B will engage the gear D and the gear A will be moved clear of the gear C, the gears C and D being separated so that this operation can take place. Thus, by shifting the double gear A—B to the two different positions shown in Figs. 2 and 3 different speed ratios can be obtained.

My invention relates to a mechanism for engaging the double gear A—B to perform this shifting operation. The same consists of a lever E having a partial circular mouthed end. F designates the engaging piece, the same being slotted so as to have parallel plane engaging faces *f—f* to engage the gear A. The yoked open-mouthed end of the lever E is preferably provided with a groove G and the engaging piece F is provided with a rib H for engaging this groove.

The lever E can be cheaply made by boring out an opening corresponding to the circle, by cutting away the outside part, and by then counterboring the groove G. The engaging piece can be easily made by turning and slotting.

It will be seen that the ends forming the yoked end of the lever E subtend more than half of the circle, whereby by placing the engaging piece F in the position shown in Fig. 4, it can be slipped into the yoked end with a slight turning or rolling action, whereby when the engaging piece is rocked in place in this way, it will be held in place concentrically and will also be held in position transversely by reason of the groove and rib.

The ends $f$—$f$ of the engaging piece F are finished to fit the sides of the gear A. The lever is provided with a hub I fitted in the frame of the machine, and on the end of the hub is secured a handle J, by which the shifting lever can be operated. By this arrangement, it will be seen that as the handle is thrown from the position shown in Fig. 2 to the position shown in Fig. 3 or vice versa the lever E will be turned on its hub which thereby forms a pivot for the lever, and that the lever will thereby shift the double gear A—B, the engaging piece turning in the yoked end of the lever to accommodate this movement and at all times having a nice bearing engagement with said gear. Thus a simple, cheap and efficient mechanism for the purposes described is provided.

The details and arrangements herein shown and described may be greatly varied by a skilled mechanism without departing from the scope of my invention as expressed in the claims.

Having thus fully described my invention, what I claim and desire to secure by Letters Patent is:

1. The combination of a pivoted shifting lever having a partial circular open mouthed end, a slotted circular engaging piece fitted therein, and a shiftable member engaged thereby.

2. The combination of a pivoted shifting lever having a partial circular open mouthed end, a slotted circular engaging piece fitted therein and having parallel engaging faces, and a shiftable member engaged thereby.

3. The combination of a pivoted shifting lever having a partial circular grooved open mouthed end, a slotted ribbed circular engaging piece fitted therein, and a shiftable member engaged thereby.

4. The combination of a pivoted shifting lever having a partial circular open mouthed or yoked end, the ends of the yoke subtending more than half of the circle, a slotted circular engaging piece fitted therein, and a shiftable member engaged thereby.

5. The combination of a double shifting gear, a large and small gear with either of which the double gear may be shifted to engage, a pivoted shifting lever having a partial circular open mouthed end, and a slotted circular engaging piece fitted therein and engaging the double gear.

6. The combination of a frame, a lever having a hub journaled therein, a handle on the end of the hub, said lever having a partial circular open mouthed end, a two-step double shifting gear, a large and small gear with either of which the double gear can be shifted to engage, and a slotted circular engaging piece fitted in the end of said lever and engaging the larger member of the two-step shiftable gear.

7. The combination of a frame, a lever having a hub journaled therein, a handle on the end of the hub, said lever having a partial circular open mouthed end, a shifting gear, a gear adapted to be engaged by the shifting gear and a slotted circular engaging piece fitted in the end of said lever and engaging the shiftable gear.

In testimony whereof I have hereunto affixed my signature.

JUNIUS H. BRAND.

Copies of this patent may be obtained for five cents each, by addressing the "Commissioner of Patents, Washington, D. C."